UNITED STATES PATENT OFFICE.

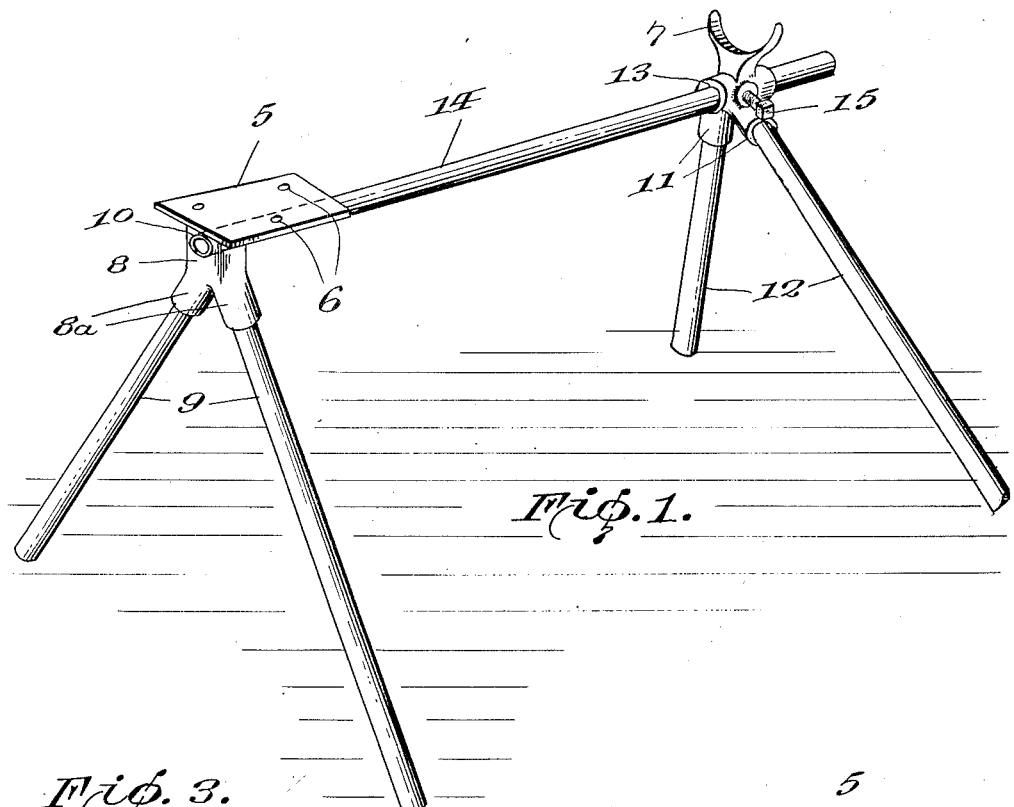
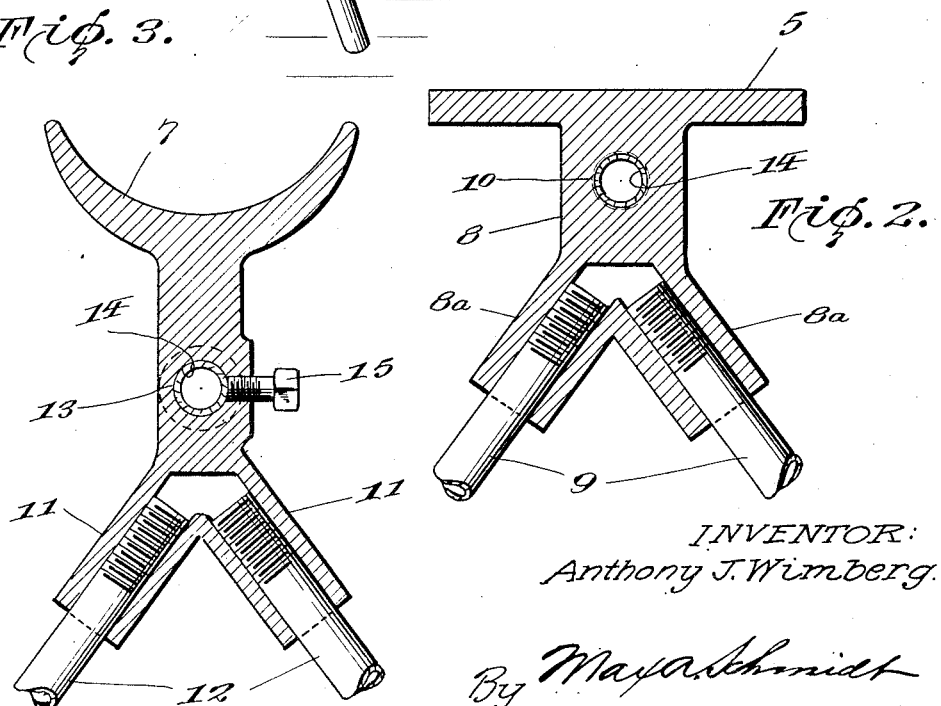

ANTHONY J. WIMBERG, OF LOUISVILLE, KENTUCKY.

VISE STAND.

1,408,675.

Specification of Letters Patent.   Patented Mar. 7, 1922.

Application filed June 11, 1921. Serial No. 476,696.

*To all whom it may concern:*

Be it known that I, ANTHONY J. WIMBERG, a citizen of the United States, residing at Louisville, in the county of Jefferson and State of Kentucky, have invented certain new and useful Improvements in Vise Stands, of which the following is a specification.

The device which is the subject matter of the present application is a stand or bench for supporting a vise or similar tool, and the object of the invention is to provide a very simple and efficient device of this kind which is portable so that it can be readily carried from place to place, and easily set up ready for use, as well as taken down.

The invention also has for its object to provide the stand with a work holder or support.

A further object of the invention is to provide a stand of the kind stated which can be taken apart for convenience in transportation, and which, when set up for use, is firm and rigid.

Another object of the invention is to provide a stand of the kind stated which is capable of certain adjustments to be hereinafter described.

In order that the invention may be better understood, reference is had to the accompanying drawing forming a part of this specification, and in said drawing, Fig. 1 is a perspective view of the stand set up ready for use; Fig. 2 is a central vertical section of the vise-supporting portion of the stand, and Fig. 3 is a similar view of the work-holding portion.

Referring specifically to the drawing, 5 denotes a vise-supporting member in the from of a flat plate having perforations 6 through which are adapted to be passed bolts or other suitable fasteners for securing the vise or similar tool in place on top of said plate. The work holder is a saddle-like member 7 which is supported in spaced relation with respect to the plate 5.

On the bottom of the plate 5 is a depending boss 8 having two downturned branches 8ª which diverge in a downward direction so as to be laterally spaced at their lower extremities. These branches are socketed to seat the upper ends of a pair of removable supporting legs 9 which diverge downwardly so as to be spaced laterally with respect to the stand.

The parts 8 and 8ª are formed integral with the plate 5, and in the part 8 is a horizontal socket 10 running in the direction of the length of the stand.

The work holder 7 has bottom bosses 11 which are similar to the bosses 8ª for holding a second pair of supporting legs 12, and it is also provided with a horizontally extending socket 13. The upper ends of the legs 9 and 12 are screw-threaded and the sockets in which they seat are correspondingly threaded, to provide a threaded connection.

The purpose of the sockets 10 and 13 is to seat the ends of a coupling rod 14 whereby the members 5 and 7 are connected in longitudinally spaced relation. A slidable connection is provided between the rod 14 and the member 7 in order that the distance between said member and the member 5 may be varied according to the length of the work to be operated on, and in order to lock said member 7 in adjusted position on the rod, a set screw 15 is provided, the same being threaded through the wall of the socket 13 to engage that portion of the rod which seats in said socket. The end of the rod 14 which seats in the socket 10 is screw-threaded, and the rod is threaded so that a threaded connection is had between the rod and the member 5.

The supporting legs 9 and 12 of the stand, as well as the longitudinal coupling member 14 may be ordinary gas piping, and hence the stand can be cheaply produced, the only parts required to be specially manufactured being the vise support and the work holder, and these being also easily and cheaply produced owing to their simplicity. The lateral spread of the legs 9 and 12 gives the stand ample stability.

As the legs 9 and 12 are detachable, and the vise support and the work holder are also removable from the coupling member 14, the stand can be easily taken apart for convenience in transportation, and the few and simple parts of which the stand is composed can be readily assembled.

The invention provides a very handy and convenient stand for use by plumbers, electricians and other mechanics engaged in work requiring the use of a vise in places where a permanent vise support is not available. Referring to Fig. 1, it will be noted that the legs 12 are not parallel to the legs 9, but that they also have an outward inclination in the direction of the length of the device to act as a brace against any pressure or push at the vise end, thereby adding greatly to the stability of the device.

I claim:

1. A stand of the character described comprising a vise-supporting member, a work holder, said member and holder having depending socketed bosses, supporting legs seating in the sockets of the bosses, said member and holder also having horizontal sockets, and a coupling rod connecting said member and holder in longitudinally spaced relation, said rod seating in the aforesaid horizontal sockets, and the work holder being adjustable on the rod toward and from the vise-supporting member.

2. A stand of the character described comprising a vise-supporting member, a work holder, said member and holder having depending socketed bosses, supporting legs removably seating in the sockets of the bosses, said member and holder also having horizontal sockets, and a coupling rod connecting said member and holder in longitudinally spaced relation, said rod removably seating in the aforesaid horizontal sockets, and the work holder being adjustable on the rod toward and from the vise-supporting member.

3. A stand of the character described comprising a vise-supporting member, a work holder, a coupling rod connecting said member and holder in longitudinally spaced relation, and on which rod the work holder is adjustable toward and from the vise-supporting member, and supporting legs for said member and holder.

In testimony whereof I affix my signature.

ANTHONY J. WIMBERG.